(12) United States Patent
Aiello et al.

(10) Patent No.: US 6,639,817 B2
(45) Date of Patent: Oct. 28, 2003

(54) SUPPLY CIRCUIT FOR AN ELECTRONIC CIRCUIT CONNECTED TO AN SMPS CONVERTER OPERATING AT LOW OUTPUT VOLTAGE

(75) Inventors: Natale Aiello, Trecastagni (IT); Francesco Giovanni Gennaro, S. Agata Li Battiati (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 10/093,078

(22) Filed: Mar. 6, 2002

(65) Prior Publication Data

US 2002/0145410 A1 Oct. 10, 2002

(30) Foreign Application Priority Data

Mar. 9, 2001 (IT) ...................... TO2001A0220

(51) Int. Cl.[7] .................................................. G05F 1/56
(52) U.S. Cl. ...................................... 363/282; 323/351
(58) Field of Search ............................... 323/222, 282, 323/351

(56) References Cited

U.S. PATENT DOCUMENTS

| | | | | |
|---|---|---|---|---|
| 4,016,461 A | * | 4/1977 | Roland | 323/282 |
| 4,347,474 A | * | 8/1982 | Brooks et al. | 323/222 |
| 4,725,768 A | * | 2/1988 | Watanabe | 323/222 |
| 4,736,151 A | * | 4/1988 | Dishner | 323/222 |
| 4,864,213 A | * | 9/1989 | Kido | 323/222 |
| 5,045,771 A | * | 9/1991 | Kislovski | 323/282 |
| 5,119,013 A | * | 6/1992 | Sabroff | 323/282 |
| 5,389,871 A | * | 2/1995 | Otake | 323/351 |
| 5,532,577 A | * | 7/1996 | Doluca | 323/282 |
| 5,847,553 A | * | 12/1998 | Beaudoin et al. | 323/282 |
| 5,886,513 A | * | 3/1999 | Appeltans et al. | 323/351 |
| 5,969,515 A | * | 10/1999 | Oglesbee | 323/351 |
| 6,369,558 B2 | * | 4/2002 | Umemoto | 323/282 |

* cited by examiner

*Primary Examiner*—Jeffrey Sterrett
(74) *Attorney, Agent, or Firm*—Lisa K. Jorgenson; E. Russell Tarleton; Seed IP Law Group PLLC

(57) ABSTRACT

An SMPS converter with an inductor connected in series to the standard inductor present in the output filter to form an inductive divider supplying an intermediate voltage having an amplitude greater than the output voltage. The intermediate voltage is supplied to a capacitor that stores the voltage during the conduction phase of the integrated circuit that forms the switch of the converter and transfers the voltage during opening of the integrated circuit to a capacitor connected between the output and the supply input of the integrated circuit.

18 Claims, 2 Drawing Sheets

US 6,639,817 B2

SUPPLY CIRCUIT FOR AN ELECTRONIC CIRCUIT CONNECTED TO AN SMPS CONVERTER OPERATING AT LOW OUTPUT VOLTAGE

BACKGROUND OF THE INVENTION

1. Field of the Invention

The present invention relates to a supply circuit for an electronic circuit connected to a switched mode power supply (SMPS) converter operating at low output voltage. In particular, the invention relates to a supply circuit for an integrated circuit operating as a switch of an SMPS converter having a circuit topology of the buck (step down or forward) type or of the buck-boost (step up/down or flyback) type.

2. Description of the Related Art

As is known, SMPS converters having a circuit topology of the buck type or the buck-boost type use inductive components, the charging and discharging of which are controlled by switches that operate switching between a saturation condition and an inhibition condition (ON/OFF).

For a more detailed treatment of SMPS converters of the type referred to above, see, for example, J. G. Kassakian, M. F. Schlecht, G. C. Verghese "Principles of Power Electronics," Addison Wesley.

At present, the aforesaid supply circuits are connected to the output of the converter and are able to operate only when the output voltage of the converter has a value greater than a preset value (8–9 V). For a better understanding, see for example the supply circuit provided in a standard buck converter illustrated in FIG. 1.

In FIG. 1, a buck converter comprises an integrated circuit 2, forming a controlled power switch, an inductor 3, a first diode 4, a first capacitor 5, and a supply circuit 6. The converter 1 moreover has a first input pin 10 receiving an input voltage Vin, a second input pin 11 connected to a ground line 12, a first output pin 13 supplying an output voltage Vo, which is positive with respect to the ground line 12 and has a value lower than that of the input voltage Vin, and a second output pin 14, connected to the ground line 12.

In detail, the integrated circuit 2, typically formed by an NMOS power transistor and a control circuit, has a first terminal (drain) connected to the first input pin 10, a second terminal (source) connected to a first intermediate node 18, and a supply input 19 receiving a supply voltage Vcc. The inductor 3 has a first terminal connected to the first intermediate node 18 and a second terminal directly connected to the first output pin 13.

The first diode 4 has its cathode connected to the first intermediate node 18 and its anode connected to the ground line 12.

The first capacitor 5 has a first terminal connected to the first output pin 13 and a second terminal connected to the second output pin 14.

The supply circuit comprises a second diode 20 and a second capacitor 21. The second diode 20 has its anode connected to the first output pin 13 and its cathode connected to the supply input 19 of the integrated circuit 2. The second capacitor 21 is connected between the first intermediate node 18 and the supply input 19 of the integrated circuit 2.

In a known way, the integrated circuit 2 performs a power conversion between the first input pin 10 and the first intermediate node 18. The voltage on the first intermediate node 18 is filtered by the inductor 3 and by the first capacitor 5. The first diode 4 enables recirculation of the current of the inductor 3 when the integrated circuit 2 opens, disconnecting the first intermediate node 18 from the first input pin 10.

The second diode 20 connects the first output pin 13 to the supply input 19 of the integrated circuit 2 and discharges the second capacitor 21 during opening of the integrated circuit 2. The second capacitor 21 filters the output voltage Vo and stabilizes it.

The supply circuit 6 of FIG. 1 can be used if the output voltage Vo is higher than the supply voltage Vcc of the integrated circuit 2, since $$Vcc = Vo - V_D$$

where $V_D$ is the voltage drop on the second diode 20.

Consequently, the supply circuit 6 of FIG. 1 is limited in its application.

In order to extend the range of output voltage of the converter 1 of FIG. 1, one known solution is to provide a double winding on the inductor 3, as shown in FIG. 2, wherein a second winding 3a is connected between the first intermediate node 18 and the anode of a second diode 20', so as to take and supply to the integrated circuit 2 the voltage present on the first intermediate node 18, which is higher than the voltage present on the first output pin 13 when the integrated circuit 2 is closed.

The above solution is advantageous only in insulated converters, wherein a high-frequency transformer is already available, as in the case, for example, of a flyback converter provided with transformer, in which the introduction of an additional winding does not affect costs very much.

Instead, this solution is not economically advantageous in non-insulated converters using a standard inductor insulated in lacquer.

BRIEF SUMMARY OF THE INVENTION

The disclosed embodiments of the present invention provide a supply circuit for an electronic circuit connected to an SMPS converter operating at a low output voltage that does not present the drawbacks previously described.

According to the embodiments of the present invention, there is provided an SMPS converter having a first input receiving an input voltage, an output supplying an output voltage, a controlled switch connected between said first input and an intermediate node, a first component connected between said intermediate node and said output, a second component connected between said intermediate node and a reference-potential line, one of said first component and said second component comprising an inductive element, and another of said first and second components comprising a unidirectional current-conducting element, and a supply circuit connected to said inductive element and having an output pin that supplies a supply voltage, the supply circuit having an energy taking element connected to said inductive element, an energy accumulation element connected to said energy taking element and storing an electric voltage, and a voltage transfer element connected between said energy accumulation element and said output pin of said supply circuit.

BRIEF DESCRIPTION OF THE SEVERAL VIEWS OF THE DRAWING(S)

For a better understanding of the present invention, two embodiments thereof are now described, purely by way of non-limiting example, with reference to the attached drawings, wherein.

DETAILED DESCRIPTION OF THE INVENTION

Figure 1:
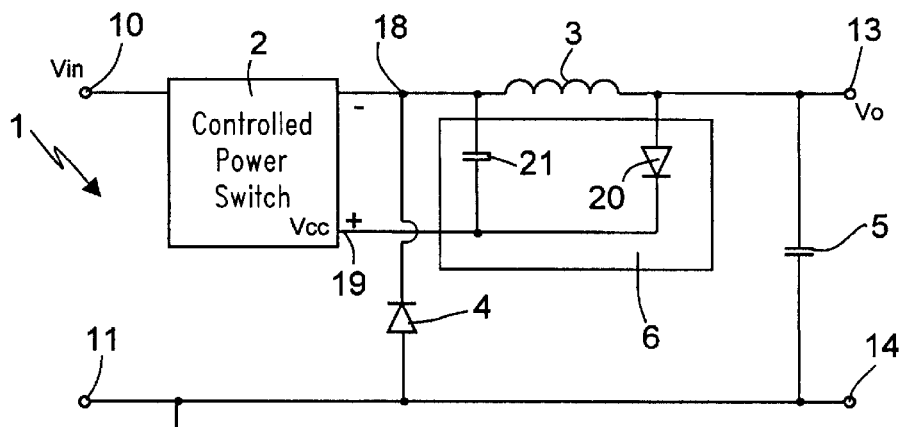
FIG. 1 illustrates a circuit diagram of a known converter provided with a supply circuit for the integrated power switch.
Figure 2:
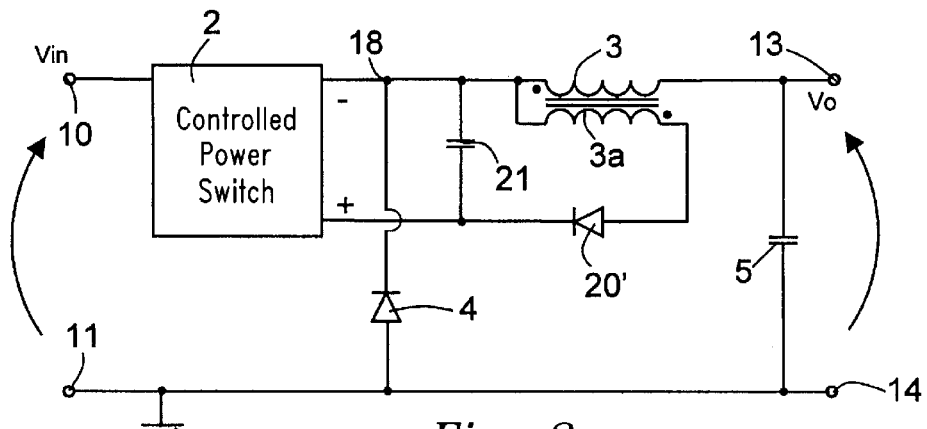
FIG. 2 illustrates a circuit diagram of a known converter provided with a different supply circuit.
Figure 3:
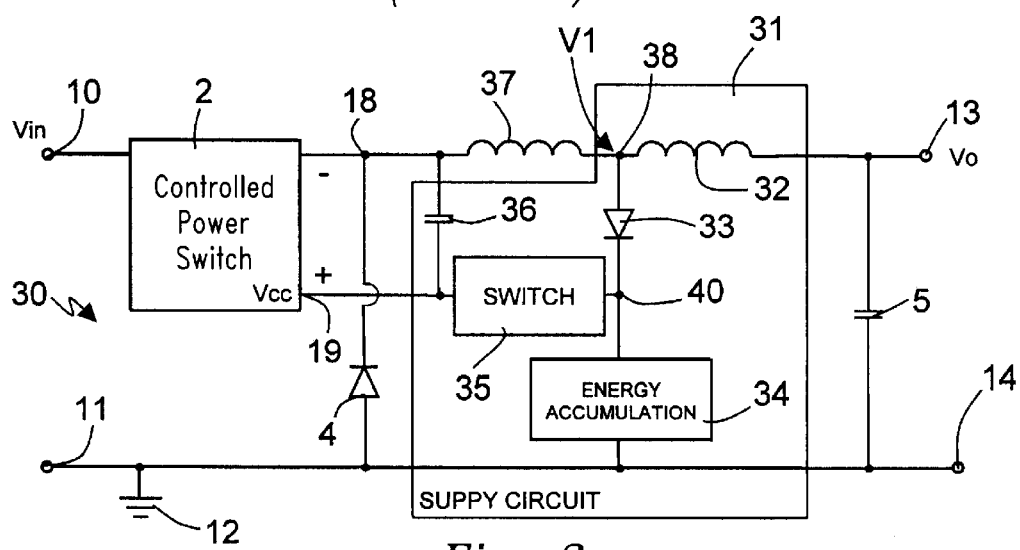
FIG. 3 is a simplified circuit diagram of a first embodiment of the converter according to the invention.

As illustrated in FIG. 3, a converter 30 of an SMPS type has a buck-type circuit topology similar to that of the known converter 1 shown in FIG. 1. Consequently, the elements that are in common with the converter 1 shown in FIG. 1 are designated with the same reference numbers and will not be described further herein.

In the converter 30 of FIG. 3, the standard inductor 3, which in FIG. 3 is indicated as first inductor 37, is no longer directly connected to the first output pin 13. A supply circuit 31 is in fact connected between the first inductor 37, the first output pin 13 and the supply input 19 of the integrated circuit 2.

The supply circuit 31 comprises a second inductor 32, a second diode 33, an energy accumulation block 34, a switch 35, and a second capacitor 36.

In detail, the second inductor 32 is connected in series to the first inductor 37, namely between the latter and the first output pin 13. In practice, the first inductor 37 and the second inductor 32 form an inductive divider and are connected at a second intermediate node 38.

The second diode 33 has its anode connected to the second intermediate node 38 and its cathode connected to a third intermediate node 40. The energy accumulation block 34 is connected between the third intermediate node 40 and the ground line 12. The switch 35 is connected between the third intermediate node 40 and the supply input 19 of the integrated circuit 2; and the second capacitor 36 is connected between the first intermediate node 18 and the supply input 19 of the integrated circuit 2.

The second inductor 32 has a much lower value than the first inductor 37 and is sized according to the desired supply voltage Vcc and to the minimum value envisaged for the output voltage Vo. In addition, the first inductor 37 is sized so that the sum of the inductances of the inductors 37 and 32 is equal to the inductance of the standard inductor 3. In practice, in the converter 30 of FIG. 3, the standard inductor 3 has been divided into the two inductors 37 and 32 having appropriate values, so to have an appropriate voltage in the second intermediate node 38. For example, in a typical application, with Vin=200–300 V and Vo<5 V and a base switching frequency of the integrated circuit of 40–50 kHz, the inductors 37 and 32 may have an inductance of 1.5 mH and 300–400 mH, respectively.

Consequently, in the supply circuit 31 of FIG. 3, on the second intermediate node 38 there is a (positive) voltage V1 which is intermediate between the voltage present on the first intermediate node 18 and the output voltage Vo. During turning-on of the integrated circuit 2, the intermediate voltage V1 is taken by the second diode 33, which therefore operates (together with the second inductor 32) as a voltage taking element, and is supplied to the energy accumulation block 34, which operates as a voltage buffer or storage device.

During the current recirculation phase, when the integrated circuit 2 opens and the first intermediate node 18 is disconnected from the supply voltage Vin, the voltage on the inductors 37, 32 is inverted, and the second diode 33 opens.

The switch 35, which was previously open, closes and supplies the energy accumulated to a first pin of the second capacitor 36. A second pin of the second capacitor 36, connected to the first intermediate node 18, is clamped to a voltage slightly lower than 0 V by the diode 4, which enables recirculation of the current flowing through the first inductor 37 and the second inductor 32, as well as through the first capacitor 5.

The second capacitor 36 is then charged to the supply voltage Vcc via the switch 35. In addition, it filters and stabilizes the voltage supplied by the energy accumulation block 34 and thus enables supply of the integrated circuit 2 at a stabilized supply voltage Vcc when the integrated circuit 2 closes again. Thereby, the supply circuit 31 generates a supply voltage Vcc having a desired value and referred to the voltage present on the output of the integrated circuit 2 (first intermediate node 18) in any operating condition of the converter 30.

Figure 4:
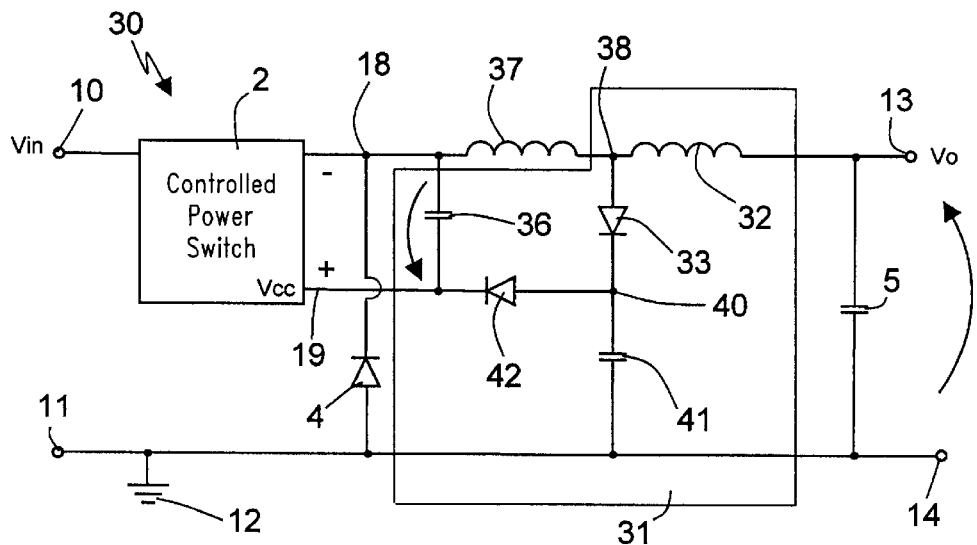
FIG. 4 shows a more detailed circuit diagram of the converter of FIG. 3.

The energy accumulation block 34 may be simply formed by an accumulation capacitor 41, as shown in FIG. 4.

The switch 35 may be simply formed by a transfer diode 42 having its anode connected to the third intermediate node 40 and its cathode connected to the supply input 19 of the integrated circuit 2. The accumulation capacitor 41 is conveniently a low voltage capacitor, and hence inexpensive. For example, in the case referred to above, with Vin= 200–300 V and Vo<8 V, with Vcc=10–30 V, V1 may be approximately 50 V, and the capacitance C of the accumulation capacitor 41 may be 10 nF.

Before recirculation, when the integrated circuit 2 is closed, the transfer diode 42 is off, since the second capacitor 36 clamps the cathode of the transfer diode 42 at a higher voltage with respect to the anode. At start of recirculation, conduction of the transfer diode 42 is guaranteed by the fact that the first intermediate node 18 is at a negative voltage close to that of the ground line 12. In general, the sizing of the second capacitor 36 and of the accumulation capacitor 41 (which together now form a capacitive divider) guarantee on the one hand that a supply voltage Vcc having the desired value is obtained, and on the other hand proper operation of the supply circuit 31.

Thereby, using a small number of components having a low cost (the second inductor 32 and the accumulation capacitor 41 are small components, respectively for a low current and for a low voltage) it is possible to obtain a supply voltage sufficient for supplying an electronic device (here the switch formed by the integrated circuit 2) also in the case of a low output voltage Vo.

Figure 5:
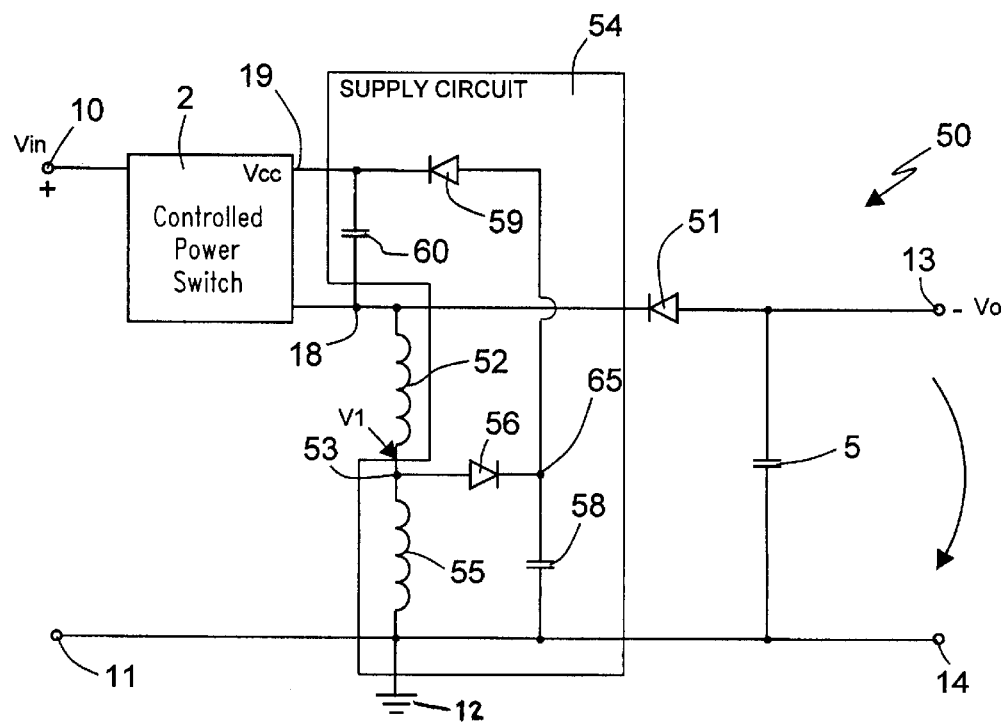
FIG. 5 shows a circuit diagram of a second embodiment of the converter according to the invention.

FIG. 5 shows the schematic circuit diagram of another embodiment of the converter according to the invention. In FIG. 5, a converter 50 has a buck-boost circuit topology, similar to that of the converter 30 of FIG. 4, except for the fact that the diode and the inductor are exchanged with each other, and hence the supply circuit is connected differently. The elements in common with those of the converter 30 of FIG. 4 are therefore designated by the same reference numbers and will not be described any further.

In detail, in the converter 50, a diode 51 has its cathode connected to the first intermediate node 18 and its anode connected to the first output pin 13. A first inductor 52 is connected between the first intermediate node 18 and a second intermediate node 53; and a supply circuit 54 is connected between the second intermediate node 53, the ground line 12 and the supply input 19 of the integrated circuit 2.

The supply circuit 54 comprises a second inductor 55, a second diode 56, an accumulation capacitor 58, a transfer diode 59, and a supply capacitor 60.

In detail, the second inductor 55 is connect in series to the first inductor 52, namely between the second intermediate node 53 and the ground line 12. The second diode 56 has its anode connected to the second intermediate node 53 and its cathode connected to a third intermediate node 65. The accumulation capacitor 58, forming an energy accumulation block similar to the block 34 of FIG. 3, is connected between the third intermediate node 65 and the ground line 12.

The transfer diode 59, forming a unidirectional 1 switch similar to the switch 35 of FIG. 3, is connected between the third intermediate nod 65 and the supply input 19 of the integrated circuit 2; and the supply capacitor 60, which is a low voltage one, and hence inexpensive, is connected between the first intermediate node 18 and the supply input 19 of the integrated circuit 2.

Also in the embodiment of FIG. 5, the second inductor 55 has a much lower value than the first inductor 52 and is sized according to the desired supply voltage Vcc and to the minimum value envisaged for the output voltage Vo.

The converter 50 of FIG. 5 operates in a similar and dual way with respect to the converter 30 shown in FIGS. 3 and 4. In particular, the first inductor 52 and the second inductor 55 form an inductive divider, the intermediate voltage V1 (positive with respect to ground during conduction of the integrated circuit 2) whereof is taken by the second diode 56 and is used for charging the accumulation capacitor 58, which stores it.

When the integrated circuit 2 turns off and recirculation of the current flowing in the inductors 52, 55 starts through the first diode 51 and the first capacitor 5, the voltage on the inductors 52, 55 is inverted, the second diode 56 opens, the transfer diode 59 (which now has its cathode at a lower voltage than the anode, since the recirculation diode 51 clamps the voltage on the first intermediate node 18 at a negative value and the supply capacitor 60 clamps the voltage on the supply terminal 19 at a lower value than the voltage present on the third intermediate node 65) turns on and transfers part of the positive voltage present on the accumulation capacitor 58 to the supply capacitor 60.

By appropriate sizing of the components, it is therefore possible to obtain a stabilized supply voltage having an appropriate value on the supply input 19 of the integrated circuit 2.

The converter described has the following advantages. First, it makes it possible to obtain, through the supply circuit 31 or 54, a supply voltage higher than the absolute value of the output voltage Vo. The supply circuit is simple and reliable and is made up of low cost elements.

Finally, it is clear that modifications and variations may be made to the converter described herein, without thereby departing from the scope of the present invention. For example, the supply circuit 31 or 54 can be used for supplying other electronic components or devices connected to the SMPS converter and having supply voltages referred to the output pin of the integrated circuit 2.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

What is claimed is:

1. An SMPS converter comprising a first input receiving an input voltage, an output supplying an output voltage, a controlled power switch connected between said first input and an intermediate node, a first component connected between said intermediate node and said output, a second component connected between said intermediate node and a reference potential line, one of said first and second components comprising an inductive element, and another of said first and said second components comprising a unidirectional current conducting element, and a supply circuit connected to said inductive element and having an output pin that supplies a supply voltage, said supply circuit comprising an energy taking means connected to said inductive element, an energy accumulation means connected to said energy taking means for storing an electric voltage, and a voltage transfer element connected between said energy accumulation means and said output pin of said supply circuit; said energy taking means comprising an energy taking inductor connected to said inductive element at an energy taking node, said energy taking means and said inductive element forming an inductive divider, and said energy accumulation means connected to said energy taking node at least in a first operating phase of said converter.

2. The SMPS converter of claim 1 wherein said electrical voltage has an amplitude greater than said output voltage.

3. The SMPS converter of claim 1 wherein said first component is a diode having its cathode connected to said intermediate node and its anode connected to said output, and wherein said second component is an inductor.

4. The SMPS converter of claim 1 wherein said energy taking means further comprises a first unidirectional switch connected between said energy taking node and said energy accumulation means and closed in said first operating phase.

5. The SMPS converter of claim 4 wherein said first unidirectional switch comprises an energy taking diode having its anode connected to said energy taking node and its cathode connected to said energy accumulation means.

6. The SMPS converter of claim 1 wherein said energy accumulation means comprises a capacitor.

7. The SMPS converter of claim 1 wherein said voltage transfer element comprises a unidirectional switch and a voltage hold element.

8. The SMPS converter of claim 7 wherein said unidirectional switch comprises a transfer diode having its anode connected to said energy accumulation means and its cathode connected to said output pin of said supply circuit, and said voltage hold element comprises a capacitor connected between said output pin of said supply circuit and said intermediate node.

9. The SMPS converter of claim 1 wherein said first component is an inductor, and said second component is a diode having its anode connected to said reference potential line and its cathode connected to said intermediate node.

10. An SMPS converter comprising a first input receiving an input voltage, an output supplying an output voltage, a controlled switch connected between said first input and an intermediate node, a first component connected between said intermediate node and said output, a second component connected between said intermediate node and a reference potential line, one of said first and second components comprising an inductive element, and another of said first and said second components comprising unidirectional current conducting element, and a supply circuit connected to said inductive element and having an output pin that supplies a supply voltage, said supply circuit comprising an energy taking means connected to said inductive element, an energy accumulation means connected to said energy taking means for storing an electric voltage, and a voltage transfer element connected between said energy accumulation means and said output pin of said supply circuit, the voltage transfer element comprising a unidirectional switch and a voltage hold element, the unidirectional switch comprising a transfer diode having its anode connected to said energy accumulation means and its cathode connected to said output pin of said supply circuit, and said voltage hold element comprising a capacitor connected between said output pin of said supply circuit and said intermediate node.

11. A method for generating a supply voltage starting from an SMPS converter, comprising the steps of:

supplying, in a first operating step, an input voltage to an output filter comprising an inductive component, said inductive component being traversed, during said first operating step, by a conversion current associated with a conversion voltage;

interrupting said step of supplying an input voltage;

causing a recirculation current to flow through said converter in a second operating step;

taking, during said first operating step, part of said conversion energy, comprising connecting an inductive divider between an input and an output of the converter;

accumulating, in said first operating step, said part of conversion energy in a storage element to generate a storage potential connecting the storage element to an intermediate node of the inductive divider; and transferring said storage potential to a supply terminal during said second operating step.

12. The method according to claim 11 wherein said transferring step comprises supplying a storage element and generating a supply voltage via said storage element.

13. An SMPS converter, comprising:

a controlled power switch coupled between a voltage-receiving input and an intermediate node;

a first inductor coupled between the intermediate node and an output; and a supply circuit coupled between the first inductor and the output and having a supply voltage output coupled to a supply voltage input (Vcc) on the controlled power switch, the supply circuit comprising a second inductor coupled in series between the first inductor and the output, the supply circuit configured to supply a recirculation current to the supply voltage input (Vcc) when an input voltage on the voltage-receiving input of the controlled power switch is interrupted at the intermediate node.

14. The converter of claim 13, wherein the supply circuit comprises first and second series-connected diodes coupled to a node formed by the connection of the first and second inductors and coupled to the supply voltage output.

15. The converter of claim 14, wherein the supply circuit further comprises a first capacitor coupled between the supply voltage output and the intermediate node, and a second capacitor coupled between a reference voltage and a node formed by the connection of the first and second diodes.

16. An SMPS converter, comprising:

a controlled power switch coupled between a voltage-receiving input and an intermediate node and configured to control an input voltage (Vin) received on the voltage-receiving input;

a first inductor coupled between the intermediate node and a ground reference potential; and a supply circuit coupled between the first inductor and the ground reference potential and having a supply voltage output coupled to a supply voltage input (Vcc) of the controlled power switch, the supply circuit comprising a second inductor coupled between the first inductor and the ground reference potential, the supply circuit configured to supply a recirculation current to the controlled power switch when the input voltage supplied to the intermediate node through the controlled power switch is interrupted.

17. The converter of claim 16, wherein the supply circuit comprises first and second series-connected diodes coupled between the supply voltage output and the node formed by the connection of the first and second inductors.

18. The converter of claim 17, further comprising a first capacitor coupled between the first intermediate node and the supply voltage output of the supply circuit, and a second capacitor coupled between the ground reference potential and a node formed by the connection of the first and second diodes.

* * * * *

UNITED STATES PATENT AND TRADEMARK OFFICE
CERTIFICATE OF CORRECTION

PATENT NO. : 6,639,817 B2
DATED : October 28, 2003
INVENTOR(S) : Natale Aiello et al.

It is certified that error appears in the above-identified patent and that said Letters Patent is hereby corrected as shown below:

<u>Column 7,</u>
Line 1, "comprising unidirectional current" should read as -- comprising a unidirectional current --.
Line 36, "connecting" should read as -- by connecting --.

Signed and Sealed this

Sixteenth Day of March, 2004

JON W. DUDAS
*Acting Director of the United States Patent and Trademark Office*